United States Patent
Lin et al.

(10) Patent No.: US 8,838,866 B2
(45) Date of Patent: Sep. 16, 2014

(54) OPERATION METHOD FOR A COMPUTER SYSTEM

(75) Inventors: Liang-Chun Lin, Hsinchu (TW); Hua-Chih Yang, Hsinchu (TW)

(73) Assignee: Prolific Technology Inc., Taipei (TW)

( * ) Notice: Subject to any disclaimer, the term of this patent is extended or adjusted under 35 U.S.C. 154(b) by 132 days.

(21) Appl. No.: 13/349,178

(22) Filed: Jan. 12, 2012

(65) Prior Publication Data

US 2012/0185631 A1 Jul. 19, 2012

(30) Foreign Application Priority Data

Jan. 13, 2011 (TW) .............................. 100101310 A

(51) Int. Cl.
*G06F 13/36* (2006.01)
*G06F 13/40* (2006.01)

(52) U.S. Cl.
CPC .... *G06F 13/4027* (2013.01); *G06F 2213/0026* (2013.01); *G06F 2213/0032* (2013.01)
USPC .......................................... 710/306; 710/315

(58) Field of Classification Search
CPC ................... G06F 13/4027; G06F 2213/0026; G06F 2213/0032; G06F 13/4022; G06F 13/4059; G06F 13/404; G06F 13/4031; G06F 13/385; G06F 13/387; G06F 3/4059; G06F 3/0661
USPC ................................................. 710/306, 315
See application file for complete search history.

(56) References Cited

U.S. PATENT DOCUMENTS

| | | | | |
|---|---|---|---|---|
| 4,706,081 | A | * | 11/1987 | Hart et al. ...................... 370/254 |
| 5,928,362 | A | * | 7/1999 | Cardillo et al. .................. 726/20 |
| 6,128,673 | A | * | 10/2000 | Aronson et al. ................ 710/22 |
| 6,618,788 | B1 | | 9/2003 | Jacobs |
| 6,735,650 | B1 | | 5/2004 | Rothberg |
| 6,895,455 | B1 | * | 5/2005 | Rothberg ......................... 710/74 |
| 7,003,527 | B1 | * | 2/2006 | Lavallee et al. ...................... 1/1 |
| 7,051,101 | B1 | * | 5/2006 | Dubrovsky et al. ........... 709/225 |
| 7,058,748 | B1 | | 6/2006 | Jacobs et al. |
| 7,159,065 | B1 | * | 1/2007 | Marlatt ......................... 710/313 |
| 7,283,547 | B1 | * | 10/2007 | Hook et al. .................... 370/412 |
| 7,917,681 | B2 | * | 3/2011 | Suzuki et al. ................. 710/312 |

(Continued)

FOREIGN PATENT DOCUMENTS

| | | | | |
|---|---|---|---|---|
| CN | 101840381 A | * | 9/2010 | .............. G06F 13/10 |
| CN | 101517988 B | * | 9/2012 | .............. H04Q 11/04 |

(Continued)

OTHER PUBLICATIONS

"NN9409611: Generic OS/2 Support for CD-ROM Devices", Sep. 1, 1994, IBM, IBM Technical Disclosure Bulletin, vol. 37, Iss. 9, pp. 611-612.*

(Continued)

*Primary Examiner* — Faisal M Zaman
(74) *Attorney, Agent, or Firm* — Rabin & Berdo, P.C.

(57) ABSTRACT

A device receives a standard command. The device judges whether an address field and/or a data length field and/or a data field of the standard command includes at least one of a vendor command, a vendor data and a checkword. The device judges whether the address field and/or a data length field and/or the data field of the standard command matches a vendor predetermined pattern. If matched, the device performs a vendor operation based on the vendor command and/or the vendor data of the standard command.

12 Claims, 2 Drawing Sheets

(56) References Cited

U.S. PATENT DOCUMENTS

| | | | |
|---|---|---|---|
| 8,069,257 B1 * | 11/2011 | Bhatia et al. | 709/230 |
| 2003/0002669 A1 * | 1/2003 | Miller | 380/46 |
| 2003/0158992 A1 * | 8/2003 | Ajanovic et al. | 710/305 |
| 2005/0055575 A1 * | 3/2005 | Evans et al. | 713/201 |
| 2005/0223154 A1 * | 10/2005 | Uemura | 711/4 |
| 2006/0251087 A1 | 11/2006 | Ng et al. | |
| 2007/0038793 A1 * | 2/2007 | Wehage et al. | 710/305 |
| 2007/0064737 A1 * | 3/2007 | Williams | 370/473 |
| 2007/0237266 A1 * | 10/2007 | Reial et al. | 375/341 |
| 2007/0288467 A1 * | 12/2007 | Strassner et al. | 707/10 |
| 2009/0089842 A1 * | 4/2009 | Perry et al. | 725/78 |
| 2009/0105849 A1 * | 4/2009 | Glanzer et al. | 700/21 |
| 2009/0193164 A1 * | 7/2009 | Ajanovic et al. | 710/107 |
| 2011/0022812 A1 * | 1/2011 | van der Linden et al. | 711/163 |
| 2012/0072924 A1 * | 3/2012 | Khanvilkar et al. | 719/326 |

FOREIGN PATENT DOCUMENTS

| | | | | |
|---|---|---|---|---|
| JP | 2005352805 A | * | 12/2005 | G06F 3/23 |
| KR | 100458144 B1 | * | 11/2004 | G06F 15/163 |
| KR | 100837742 B1 | * | 6/2008 | H04B 1/40 |
| WO | WO 2007143259 A3 | * | 4/2008 | G06F 3/00 |

OTHER PUBLICATIONS

"NN9401533: Generic Device Driver for Personal Computer Compact Disk Read-Only Memory", Jan. 1, 1994, IBM, IBM Technical Disclosure Bulletin, vol. 37, Iss. 1, pp. 533-536.*

* cited by examiner

OPERATION METHOD FOR A COMPUTER SYSTEM

This application claims the benefit of Taiwan application Serial No. 100101310, filed Jan. 13, 2011, the subject matter of which is incorporated herein by reference.

TECHNICAL FIELD

The disclosure relates in general to an operation method for a computer system.

BACKGROUND

Conventionally, if a storage capacity needs to be increased, a user has to open a computer casing in order to install or replace a hard disc drive with larger capacity. However, it is difficult and complicated for an ordinary user who is not familiar with computer hardware to do the installation or replacement, and the hardware may even be damaged due to the user's unskilled operation.

To resolve the above problems, interface specifications such as USB and IEEE1394 are provided. The storage device is connected to a computer through the interfaces to increase the storage capacity conveniently. As the requirements of speed and capacity are getting higher and higher, data storage media have been developed from floppy disc, memory card, CD, DVD to external/internal hard disc drive.

The universal serial bus (USB) specification, which provides external peripheral equipment with a standard output/input interface, was developed in 1996. Following the in-built serial advanced technology attachment (SATA) standard, the external serial advanced technology attachment (eSATA) interface specification was developed to provide a convenient use of external hard disc. The eSATA specification used for external storage device implements high-efficient external storage, not only increasing storage capacity but also achieving excellent transmission rate.

The external storage device (such as but not limited to hard disc and optical disc drive) support many connection interfaces such as but not limited to USB, 1394, Internet small computer system interface (iSCSI), and SATA. The external storage device is connected to the PCI/PCIE bus of the computer host through a bridge interface. Exemplarily but not restrictively, the bridge interface may be realized by an add-on card for the translation between different standards.

In application, the external storage device goes with a dedicated application program. The dedicated application program sends vendor commands to the external storage device so that the external storage device may achieve product differentiation by performing the vendor commands. However, when the bridge interface, between the computer host and the external storage device, performs command translation, the vendor commands may be blocked by the bridge interface, so that the vendor commands and/or vendor data sent from the application program is not allowed to be transmitted to the external storage device through the bridge interface. Thus, the disclosure resolves the above problems. Even if the bridge interface does not support the vendor commands, the vendor commands will not be blocked by the bridge interface and may thus be transmitted to the external storage device from the host.

BRIEF SUMMARY

The disclosure is directed to a computer system. Even a standard command, which contains vendor commands, and/or vendor data, and/or checkwords and is sent from the host, is translated, the accuracy of the vendor commands, and/or the vendor data and/or the checkwords are high, so that a storage device, which receives the vendor commands, and/or the vendor data and/or the checkwords, may performs a vendor operation accordingly.

According to an exemplary embodiment of the disclosure, an operation method for a computer system is provided. The computer system includes a host, a bridge interface and a device. The operation method includes: packaging at least any one of a vendor command, a vendor data and a checkword in an address field and/or a data length field and/or a data field of at least a standard command by the host according to a vendor predetermined pattern; transmitting the standard command to the bridge interface by the host; translating and transmitting the standard command to the device by the bridge interface, wherein translation by the bridge interface maintains the address field, the data length field and the data field, and the bridge interface does not support the vendor predetermined pattern; judging by the device whether the translated standard command matches the vendor predetermined pattern according to the vendor predetermined pattern; and performing a vendor operation and returning to the host by the device according to the vendor command and/or the vendor data of the translated standard command if matched.

According to an alternative exemplary embodiment of the disclosure, an operation method for a computer system is provided. The computer system includes a host, a bridge interface and a device. The operation method includes: packaging at least any one of a vendor command, a vendor data and a checkword in an address field and/or a data length field and/or a data field of at least a standard command by the host according to a vendor predetermined pattern; transmitting the standard command to the bridge interface by the host; and receiving a return data or a return status from the device by the host after the vendor command is executed by the device.

According to another alternative exemplary embodiment of the disclosure, an operation method for a computer system is provided. The computer system includes a host, a bridge interface and a device. The operation method includes: receiving a standard command transmitted from the host through the bridge interface by the device; judging by the device whether an address field and/or a data length field and/or a data field of the received standard command comprises at least one of a vendor command, a vendor data and a checkword; judging by the device whether the address field and/or the data length field and/or the data field of the received standard command matches a vendor predetermined pattern; and performing a vendor operation by the device according to the vendor command and/or the vendor data of the address field and/or the data length field and/or the data field of the standard command if the device judges that the standard command matches the vendor predetermined pattern.

It is to be understood that both the foregoing general description and the following detailed description are exemplary and explanatory only and are not restrictive of the disclosed embodiments, as claimed.

DETAILED DESCRIPTION OF THE DISCLOSURE

A bridge interface performs command translation between different communication protocols, exemplarily but not restrictively, between SCSI and ATA (that is, translating the SCSI commands from or into the ATA commands). In an embodiment of the present disclosure, vendor commands and vendor data are contained in a standard command. When the bridge interface performs command translation, the standard command will not be blocked by the bridge interface. Even if the bridge interface does not support the vendor command and the vendor data, the vendor command and the vendor data may be transmitted between the storage device and the host through the bridge interface because they are included in a standard command supported by the bridge interface. The embodiment of the disclosure is used in various communication protocols applicable to mass data storage media such as but not limited to USB, 1394, iSCSI, SATA, and eSATA.

Figure 1:
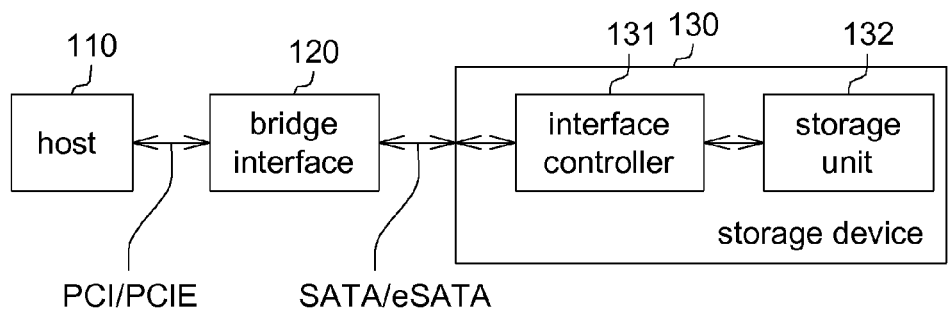
FIG. 1 shows a computer system according to an embodiment of the disclosure.

Referring to FIG. 1, a computer system according to the embodiment of the disclosure is shown. As indicated in FIG. 1, a host 110 is connected to a storage device 130 through a bridge interface 120. Here, the storage device 130 is such as but not limited to an internal or external storage device. The bridge interface 120 performs translation such as between PCI/PCIE and SATA/eSATA, but such exemplification is not for limiting the present disclosure. That is, the bridge interface 120 and the host 110 are communicated through the PCI/PCIE communication protocol, and the bridge interface 120 and the storage device 130 are communicated through the SATA/eSATA communication protocol. The bridge interface 120 supports the PCI/PCIE/SATA/eSATA standard command, but does not support the vendor command/vendor data. The storage device 130 at least includes an interface controller 131 and a storage unit 132. The interface controller 131 receives the vendor command/vendor data transmitted from a dedicated application program of the host 110 and performs corresponding operations. The storage unit 132 is for storing data. The storage device 130 supports the standard communication protocol and the vendor communication protocol as well.

If the host 110 tries to transmit a vendor command/vendor data to the storage device 130, the host 110 packages the vendor command/vendor data into the standard command and transmits the standard command containing the vendor command/vendor data to the bridge interface 120. If the standard command is a write command, data transmitted to the storage device 130 from the host 110 may be contained in the write command or data is sent after the write command. Such data is referred as a data field of the write command hereinafter for convenience of elaboration. That is, in the following descriptions, "data field" or "data structure" may refer to (1) the data field in the write command or (2) data accompanying the write command (i.e. the data field may not be in the write command). In regards to the mass storage media, address fields and data fields of commands are still accurate no matter what kind of communication protocol the mass storage media device supports or how the commands are translated during transmission. In the embodiment of the present disclosure, the vendor command/vendor data is in the address field and/or the data length field and/or the data field of the standard command. Thus, even the standard command containing the vendor command/vendor data is translated by the bridge interface 120, the vendor command/vendor data of the translated command is still accurate, wherein the vendor command/vendor data is in the address field and/or data length field and/or data field of the translated command. Thus, the vendor command/vendor data may be transmitted according to the embodiment of the disclosure.

The application program of the host 110 packages the vendor data/vendor command according to the standard, and further transmits the standard command containing the packaged vendor data/vendor command to the bridge interface 120. After passing through the bridge interface 120, the vendor data/vendor command is identified and executed by the storage device 130 so that differentiation and customization may be achieved.

For example, if a customized storage device intends to perform a vendor function, according to the present embodiment of the disclosure, the application program packages the vendor data/vendor command in a standard command supporting the standard communication protocol, so that the standard command may be through the various bridge interfaces and the vendor function may thus be performed. An in-built firmware of the storage device 130 identifies the translated command, decodes the standard command to execute the vendor command, and further sends a return data to the dedicated application program of the host 110 according to the standard communication protocol. The customized special function is performed after the return data is received and decoded by the dedicated application program of the host 110.

In the embodiment of the present disclosure, there are three operation modes for transmitting the vendor command/vendor data, namely, the vendor read mode, the vendor write mode and the vendor read/write mixed mode. If the command received by the storage device 130 matches predetermined patterns, the storage device 130 assumes that the dedicated application program of the host 110 intends to start the vendor function. Here, the predetermined pattern includes but is not limited to the following: whether the command contains the predetermined checkword, whether a receiving sequence of the commands containing the predetermined checkword matches the predetermined pattern, and whether the number of the received command containing the predetermined checkword matches a predetermined value. The three operation modes are respectively elaborated below.

Vendor Read Mode:

In the vendor read mode, if the host 110 intends the storage device to start a vendor function/operation, then the host 110 transmits one or more standard commands matching the predetermined patterns to the storage device. In the vendor read mode, exemplarily but not restrictively, the dedicated application program of the host 110 transmits standard read commands containing different specific read addresses (that is, the checkwords), wherein the sequence of the standard read commands matches the predetermined pattern.

In greater details, if to perform the vendor function, the dedicated application program of the host 110 continuously transmits a predetermined number of standard read commands matching the predetermined sequence. Each standard read command contains a predetermined special address (that is, a checkword) by which the storage device 130 judges whether to start the vendor function. For convenience of elaboration, that the dedicated application program of the host 110 continuously transmits three standard read commands each containing a predetermined special address (that is, checkword) is used as an exemplification but the disclosure is not limited thereto. Furthermore, in order to increase the accuracy, the dedicated application program of the host 110 may continuously transmit more standard read commands each containing a predetermined special address.

When the dedicated application program of the host 110 transmits a first standard read command containing a first predetermined checkword (the checkword may be in the address format for informing the storage device that the standard read command is not an ordinary standard command but a command to start vendor function), the storage device 130 receives and identifies a first translated read command translated by the bridge interface 120. The first translated read command contains the first predetermined checkword. Exemplarily but not restrictively, the first predetermined checkword is 0x64 in the address format. Meanwhile, the storage device 130 identifies that the host 110 intends to start the vendor function. In order to match the standard, the storage device 130 reads data in the storage unit 132 according to the first predetermined checkword. The first predetermined checkword is in the address format, and the first predetermined checkword usually points to a useless data in the storage unit 132. The storage device 130 returns the read data to the host 110. Because it is possible that other application program may happen to read data pointed by the first predetermined checkword. To avoid read error and to be conformed to the standard communication protocol, the storage device 130 reads and returns data to the host 110 according to the first predetermined checkword.

Similarly, when the dedicated application program of the host 110 transmits a second standard read command containing a second predetermined checkword (exemplarily but not restrictively, the second predetermined checkword is 0x27), the storage device 130 receives and identifies a second translated read command translated by the bridge interface 120. The second translated read command contains the second predetermined checkword (0x27). The storage device 130 reads and returns data to the host 110 according to the second predetermined checkword.

When the dedicated application program of the host 110 transmits a third standard read command containing a third predetermined checkword (exemplarily but not restrictively, the third predetermined checkword is 0x7b), the storage device 130 receives and identifies a third translated read command translated by the bridge interface 120. The third translated read command contains the third predetermined checkword (0x27). The storage device 130 reads and returns data to the host 110 according to the third predetermined checkword.

In the embodiment of the present disclosure, it is predetermined that when the storage device 130 continuously receives a predetermined number of standard read commands in the predetermined sequence, each standard read command containing a respective predetermined checkword, the storage device identifies that the dedicated application program of the host 110 intends to start the vendor function.

That is, if the storage device 130 receives fewer standard read commands containing predetermined checkword, the storage device will not identify that the dedicated application program of the host 110 intends to start vendor function but will read data from the storage unit 132 and return data to the host 110 according to the checkword in the read command.

Furthermore, even if the storage device 130 continuously receives a predetermined number of standard read commands containing respective predetermined checkword, in case that the receiving sequence does not match the predetermined sequence, the storage device 130 will not identify these commands as commands for activating vendor function. Instead, the storage device 130 will regard these commands as standard read commands and perform standard read function accordingly. In the above example, if the three standard read commands received by the storage device 130 are in the sequence of: (1) the standard read command containing address 0x64, (2) the standard read command containing address 0x7b, and (3) the standard read command containing address 0x27, since the receiving sequence does not match the predetermined pattern, the storage device 130 will not regard these commands as for activating vendor function. Instead, the storage device 130 will regard these commands as standard read commands and perform standard read function accordingly.

After the dedicated application program of the host 110 transmits the predetermined number of standard read command matching the predetermined sequence and containing predetermined checkword, the dedicated application program of the host 110 packages the vendor command/vendor data in the address field of the subsequent one or more standard read commands. Even translated by the bridge interface, the vendor command/vendor data is still accuracy because the vendor command/vendor data in the address field of the standard command will not be blocked or damaged during the translation. Meanwhile, after decode, the storage device 130 extracts vendor command/vendor data from the address field and performs corresponding operation according to the vendor command.

In the vendor read mode, in addition to include the vendor command/vendor data in the standard read command, exemplarily but not restrictively, by the vendor command, the host 110 writes an adjustment parameter to the storage device 130, so that the storage device 130 may adjust the parameter accordingly. That is, the vendor command may request the storage device 130 to output the vendor data to the storage device 130 from the host 110. On the contrary, in the prior art, if the host 110 transmits a standard read command to the storage device 130, this implies that the host 110 reads data from the storage device 130, not that the host 110 writes a parameter to the storage device 130.

Exemplarily but not restrictively, by the vendor command, the host 110 reads the status of the storage device 130 (that is, a vendor data input by which the status data is transmitted to the host 110 from the storage device 130). Furthermore, since the host 110 transmits a standard read command, the storage device 130 many contain a large amount of vendor data in data returned to the host 110 to increase the flexibility of the vendor function, wherein the vendor data is not the same as those data stored in the storage unit 132.

In the vendor read mode, the vendor data to be transmitted to the storage device 130 by the host 110 is normally in the address field, and the address field normally does not have many bits. Thus, if the host 110 intends to transmit a large amount of vendor data, then the host 110 may transmit several standard read commands containing the vendor data in the address field. But, if the storage device 130 intends to return a large amount of vendor data to the host 110, one vendor command would suffice to complete such operation.

Vendor Write Mode:

In the vendor write mode, when the host 110 intends to the storage device 130 to start the vendor function, the host 110 transmits a standard write command and contains the vendor command, the vendor data, and the checkword in the data field (or the data structure) to be transmitted to the storage device 130. After receiving the data field, the storage device 130 checks the data field and judges whether the host 110 intends to start the vendor function. If data contained in the data field matches the predetermined checkword, then the storage device 130 performs the vendor operation according to the vendor command/vendor data.

Selectively, the host 110 may contain the vendor command/vendor data/checkword in the address field and/or data length field of a standard write command. Likewise, the storage device 130 checks the address field and/or data length field and performs the vendor operation according to the vendor command/vendor data if matched.

If the storage device 130 checks and determines that the data field and/or data length field do not match the predetermined pattern, then the storage device 130 regards the write command as an ordinary write command and writes the data field into the storage unit 132 according to the address field of the write command so as to be conformed to the standard communication protocol.

In the vendor write mode, the vendor data returned by the storage device 130 is written in the status return data (under ordinary circumstances, by the status return data, the storage device 130 informs the host 110 that data write is successful or not). Normally, such status return data does not have many bits. When the storage device 130 intends to transmit a large amount of vendor data, the storage device 130 may need to transmit some more return commands containing the vendor data.

Of course, in the vendor write mode, the host 110 transmits a write command, but the storage device 130 may return the vendor data to the host 110 even after the vendor function is started.

Vendor Read/Write Mixed Mode:

In the vendor read/write mixed mode, if the host 110 intends to the storage device 130 to start the vendor function, then the host 110 transmits standard read commands matched the predetermined pattern and standard write commands matched the predetermined pattern. Exemplarily but not restrictively, the host 110 transmits several standard read commands matched the predetermined pattern (as disclosed in the vendor read mode) and several standard write commands matched the predetermined pattern (as disclosed in the vendor write mode). After receiving the translated read command matched the predetermined pattern (as disclosed in the vendor read mode) and the translated write command matched the predetermined pattern (as disclosed in the vendor write mode), the storage device 130 identifies that the host 110 intends to start the vendor function.

In the vendor read/write mixed mode, since the host 110 sends the data field (data structure) accompanying a standard write command, the host 110 may contain a large amount of vendor data in the data field to transmit to the storage device 130. Furthermore, in response to the read command transmitted by the host 110, the storage device 130 may contain a large amount of vendor data in the return data back to the host 110. As disclosed above, the vendor read/write mixed mode has flexibility in operation. Furthermore, in the vendor read/write mixed mode, the storage device 130 has to check the received read command and the received write command, the accuracy is high and the likelihood of error is low.

Figure 2:
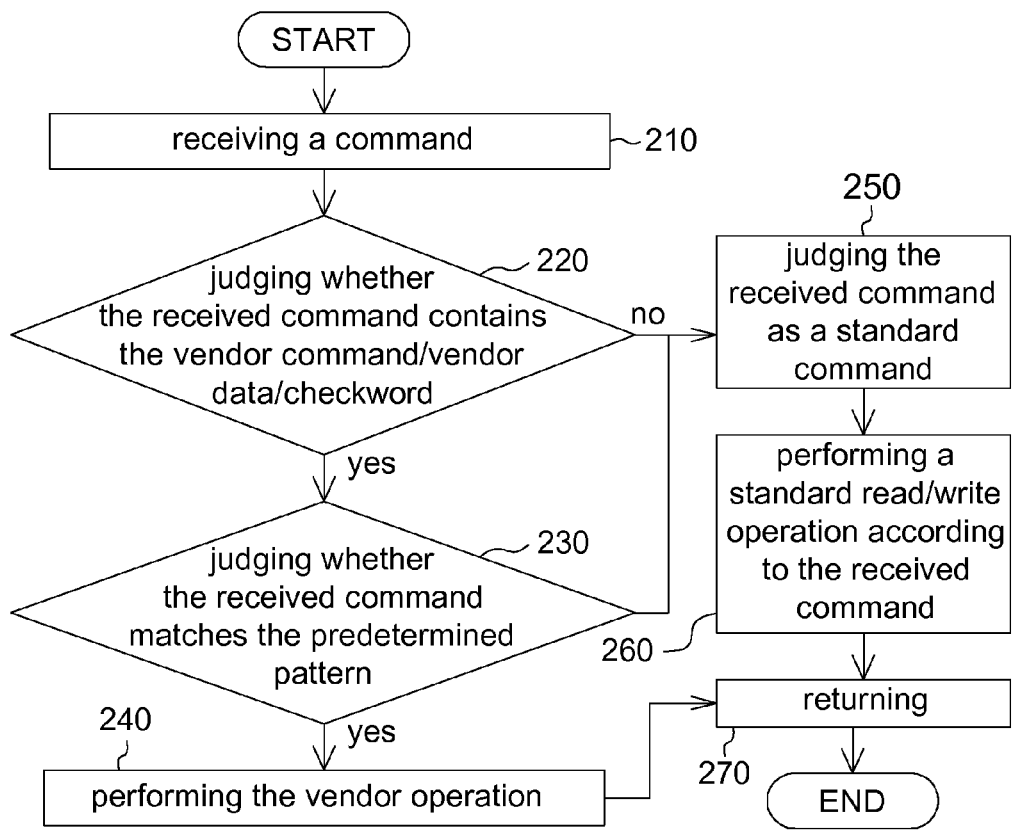
FIG. 2 shows an operation flow of a storage device according to the embodiment of the disclosure.

Referring to FIG. 2, an operation flow of the storage device 130 according to the embodiment of the disclosure is shown. In step 210, the command transmitted from the host 110 is received by the storage device 130 through the bridge interface 120. In step 220, whether the received command contains the vendor command/vendor data/checkword is judged by the storage device 130. Exemplarily but not restrictively, step 220 is performed by the interface controller 131. If yes in step 220, then the process proceeds to step 230, otherwise, the process proceeds to step 250.

In step 230, whether the received command matches the predetermined pattern is judged by the storage device 130. Exemplarily but not restrictively, according to the mode supported by the storage device 130, the host 110 informs storage device 130 to start the vendor function in one of the three modes. In the mode informed/selected by the host 110, whether one or more received commands match the predetermined pattern is judged by the storage device 130. In step 230, the details of judgment may be similar but not limited to the above disclosure. If yes in step 230, then the process proceeds to step 240, otherwise the process proceeds to step 250.

In step 240, the vendor operation is performed by the storage device 130 according to the vendor command/vendor data in the command. The details of performing the vendor operation by the storage device 130 according to the vendor command/vendor data contained in the command are exemplified in the above disclosure and are not repeated here.

In step 250, if the received command does not contain the vendor command/vendor data/checkword (that is, no in step 220) or does not match the predetermined pattern (that is, no in step 230), then the storage device 130 judges the received command as just a standard command.

In step 260, a standard read/write operation is performed by the storage device 130 according to the received command. In step 270, the storage device 130 returns data to the host 110. Exemplarily but not restrictively, if the storage device 130 performs the standard write operation, then the storage device 130 returns a data write result to the host 110 to inform the host 110 that data write is successful or not. Or, if the storage device 130 performs the standard read operation, then the storage device 130 returns data read from the storage unit 132 to the host 110. Or, if the storage device 130 performs a vendor command operation, then the storage device 130 returns the result of the vendor command operation to the host 110. Or, the storage device 130 returns the vendor data to the host 110.

Figure 3:
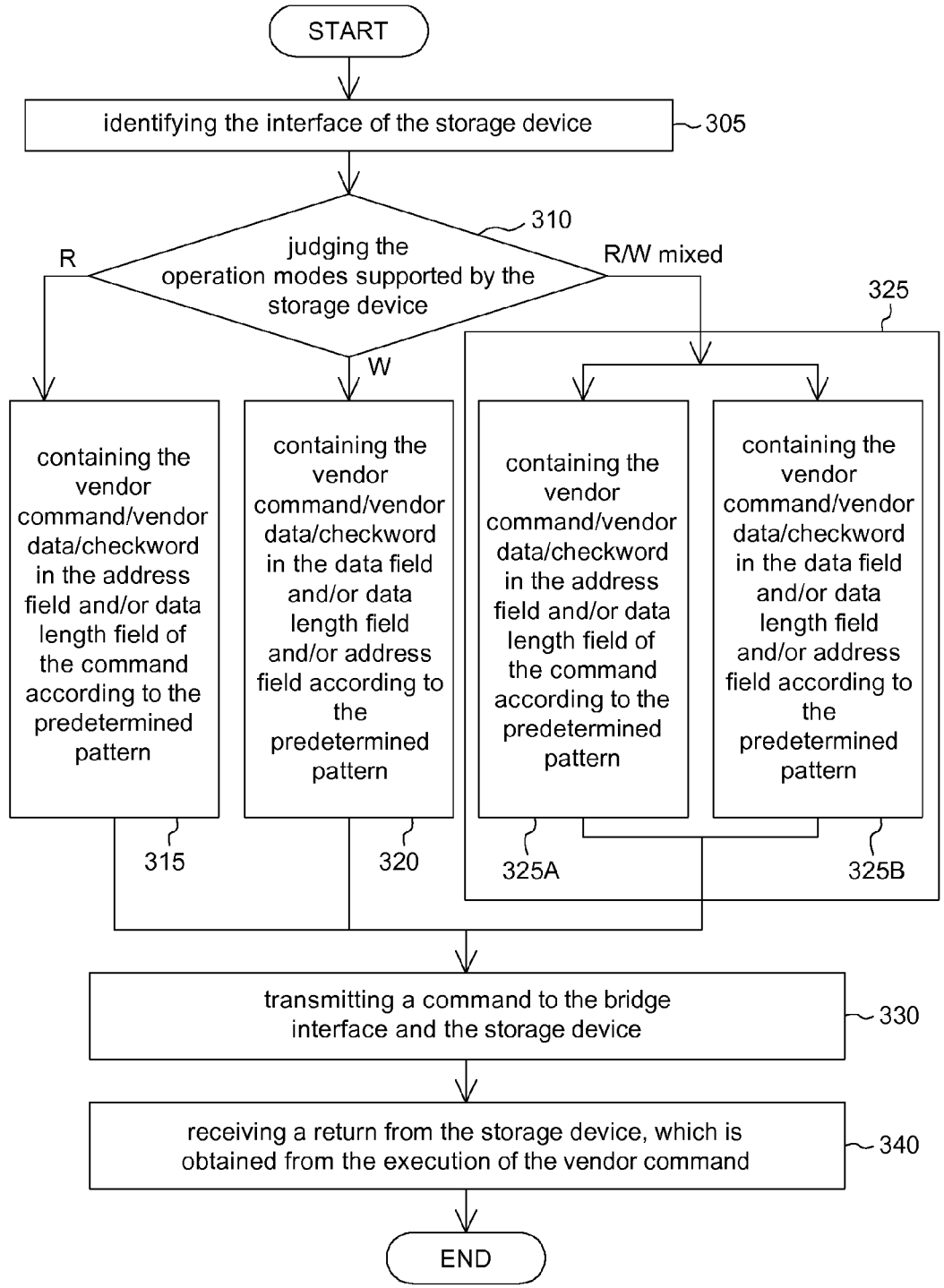
FIG. 3 shows an operation flow of a host according to the embodiment of the disclosure.

Referring to FIG. 3, an operation flow of the host 110 according to the embodiment of the disclosure is shown. The flow of FIG. 3 is performed by the dedicated application program of the host 110, wherein the dedicated application program may start the vendor function and decode the vendor data returned from the storage device 130.

In step 305, the interface of the storage device 130 is identified as such as USB, 1394, eSATA, iSCSI by the host 110. In step 310, the operation modes of vendor command/vendor data supported by the storage device 130 are judged by the host 110. The operation modes include: the vendor read mode, the vendor write mode and the vendor read/write mixed mode. If the storage device 130 supports many operation modes, then the host 110 may select one mode, and informs the storage device 130 which mode is selected for communication.

If the vendor read mode (R) is selected, as indicated in step 315, then the vendor command/vendor data/checkword is contained in the address field and/or data length field of the command by the dedicated application program of the host 110 according to the predetermined pattern. The details are already given in the above disclosure and are not repeated here.

If the vendor write mode (W) is selected, as indicated in step 320, the vendor command/vendor data/checkword is contained in the data field and/or data length field and/or address field by the dedicated application program of the host 110 according to the predetermined pattern. The details are already given in the above disclosure and are not repeated here.

If the vendor read/write mixed mode (R/W mixed mode) is selected, then steps 325A and 325B are performed by the host 110. Exemplarily but not restrictively, steps 325A and 325B are identical or similar to steps 315 and 320. The details are already given in the above disclosure and are not repeated here.

In step 330, a command is transmitted to the bridge interface and the storage device by the host 110. The bridge interface translates and transmits the command to the storage device. Then, the vendor operation is performed by the storage device according to the command. In step 340, the data/status obtained from the operation of the vendor command executed by the storage device is returned to the host 110.

Through the present embodiment of the disclosure, the vendor operation does not affect the standard operation of standard communication protocol, the compatibility is maintained, and ordinary operation and the vendor operation are differentiated, so that products are differentiated and compatible with the standard communication protocol.

It will be appreciated by those skilled in the art that changes could be made to the disclosed embodiments described above without departing from the broad inventive concept thereof. It is understood, therefore, that the disclosed embodiments are not limited to the particular examples disclosed, but is intended to cover modifications within the spirit and scope of the disclosed embodiments as defined by the claims that follow.

What is claimed is:

1. An operation method for a computer system, the computer system including a host, a bridge interface and a device, the operation method including:
   packaging at least any one of a vendor command, vendor data and a checkword in a respective address field and/or a respective data length field and/or a respective data field of a plurality of standard commands by the host according to a vendor predetermined pattern;
   transmitting the standard commands to the bridge interface by the host;
   translating the standard commands and transmitting the translated commands to the device by the bridge interface, wherein translation by the bridge interface maintains the address field, the data length field and the data field, and the bridge interface does not support the vendor predetermined pattern;
   judging by the device whether the translated standard commands match the vendor predetermined pattern according to the vendor predetermined pattern to determine whether to perform a vendor operation, the device judging at least one of whether a receiving sequence of the translated standard commands containing a predetermined checkword matches a predetermined receiving sequence pattern, and whether the number of the received translated standard commands containing the predetermined checkword matches a predetermined value; and
   performing the vendor operation and returning to the host by the device according to the vendor command and/or the vendor data of the translated standard commands if matched.

2. The operation method according to claim 1, further comprising:
   identifying an interface of the device by the host; and
   identifying a supported vendor transmission mode of the device by the host.

3. The operation method according to claim 1, wherein the device judges whether each of the translated standard commands contains the predetermined checkword;

in a vendor read mode:
   a plurality of predetermined checkwords are respectively packaged in a plurality of standard read commands by the host according to the vendor predetermined pattern;
   the vendor command and/or the vendor data are packaged in at least a subsequent standard read command by the host according to the vendor predetermined pattern;
   the bridge interface translates the standard read commands and the subsequent standard read command;
   the device judges whether the translated standard read commands match the vendor predetermined pattern; and
   the device performs the vendor operation according to the vendor command and/or the vendor data of the translated subsequent standard read command if matched.

4. The operation method according to claim 1, wherein in a vendor write mode:
   the vendor command, the vendor data and the checkword are packaged in at least a standard write command by the host according to the vendor predetermined pattern;
   the bridge interface translates the standard write command;
   the device judges whether the standard write command matches the vendor predetermined pattern; and
   the device performs the vendor operation according to the vendor command and/or the vendor data in the translated standard write command if matched.

5. The operation method according to claim 1, wherein in a vendor read/write mixed mode:
   a plurality of predetermined checkword are respectively packaged in a plurality of standard read commands by the host according to the vendor predetermined pattern;
   the vendor command and/or the vendor data are packaged in at least a subsequent standard read command by the host according to the vendor predetermined pattern;
   the bridge interface translates the standard read commands and the subsequent standard read command;
   the device judges whether the translated standard read commands match the vendor predetermined pattern;
   the device performs the vendor operation according to the vendor command and/or the vendor data of the translated subsequent standard read command if matched;
   the vendor command, the vendor data and the checkword are packaged in at least a standard write command by the host according to the vendor predetermined pattern;
   the bridge interface translates the standard write command;
   the device judges whether the standard write command matches the vendor predetermined pattern; and
   the device performs the vendor operation according to the vendor command and/or the vendor data in the translated standard write command if matched.

6. An operation method for a computer system, the computer system including a host, a bridge interface and a device, the operation method including:
   packaging at least any one of a vendor command, vendor data and a checkword in a respective address field and/or a respective data length field and/or a respective data field of a plurality of standard commands by the host according to a vendor predetermined pattern which includes at least one of that a sending sequence of the standard commands containing a predetermined checkword matches a predetermined sending sequence pattern, and that the number of the standard commands containing the predetermined checkword matches a predetermined value;
   transmitting the standard commands to the bridge interface by the host; and
   receiving a return data or a return status from the device by the host after the vendor command is executed by the device, wherein the device judges whether the standard commands match the vendor predetermined pattern according to the vendor predetermined pattern to determine whether to perform a vendor operation.

7. The operation method according to claim 6, further comprising:
identifying an interface of the device by the host; and
identifying a supported vendor transmission mode of the device by the host.

8. The operation method according to claim 6, wherein in the vendor predetermined pattern further includes whether each of the translated standard commands contains the predetermined checkword;
a vendor read mode:
a plurality of predetermined checkword are respectively packaged in a plurality of standard read command by the host according to the vendor predetermined pattern;
the vendor command and/or the vendor data are packaged in at least a subsequent standard read command by the host according to the vendor predetermined pattern.

9. The operation method according to claim 6, wherein in a vendor write mode:
the vendor command, the vendor data and the checkword are packaged in at least a standard write command by the host according to the vendor predetermined pattern.

10. The operation method according to claim 6, wherein in a vendor read/write mixed mode:
a plurality of predetermined checkwords are respectively packaged in a plurality of standard read commands by the host according to the vendor predetermined pattern;
the vendor command and/or the vendor data are packaged in at least a subsequent standard read command by the host according to the vendor predetermined pattern; and
the vendor command, the vendor data and the checkword are packaged in at least a standard write command by the host according to the vendor predetermined pattern.

11. An operation method for a computer system, the computer system including a host, a bridge interface and a device, the operation method including:
receiving a plurality of standard commands transmitted from the host through the bridge interface by the device;
judging by the device whether a respective address field and/or a respective data length field and/or a respective data field of the received standard commands comprises at least one of a vendor command, vendor data and a checkword;
judging by the device whether the respective address field and/or the respective data length field and/or the respective data field of the received standard commands matches a vendor predetermined pattern to determine whether to perform a vendor operation, the device judging at least one of whether a receiving sequence of the standard commands containing a predetermined checkword matches a predetermined receiving sequence pattern, and whether the number of the received standard commands containing the predetermined checkword matches a predetermined value; and
performing the vendor operation by the device according to the vendor command and/or the vendor data of the address field and/or the data length field and/or the data field of the standard commands if matched.

12. The operation method according to claim 11, further comprising:
in response to an inquiry from the host, the device responds an interface specification and a supported vendor translation mode to the host; and
judging by the device that whether each of the standard commands contains the predetermined checkword.

* * * * *